United States Patent
James et al.

(10) Patent No.: US 7,091,271 B2
(45) Date of Patent: *Aug. 15, 2006

(54) CORE SHELL NANOCOMPOSITE OPTICAL PLASTIC ARTICLE

(75) Inventors: Robert O. James, Rochester, NY (US); Lawrence A. Rowley, Rochester, NY (US); Daniel F. Hurley, Webster, NY (US); John Border, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 10/643,236

(22) Filed: Aug. 18, 2003

(65) Prior Publication Data

US 2005/0042453 A1 Feb. 24, 2005

(51) Int. Cl.
C08K 3/22 (2006.01)
C08K 3/30 (2006.01)
C08K 3/10 (2006.01)
C08L 33/12 (2006.01)

(52) U.S. Cl. ............ 524/430; 524/433; 524/437; 524/436; 524/425; 524/429; 524/428; 524/420; 524/402; 524/492; 524/415; 524/417; 524/439; 524/560; 524/577

(58) Field of Classification Search ........ 524/560, 524/492, 493, 433, 420, 436, 413, 430, 425, 524/437, 417, 429, 428, 402, 415, 439, 577; 428/804

See application file for complete search history.

(56) References Cited

U.S. PATENT DOCUMENTS

| 5,217,804 | A | 6/1993 | James et al. ............... 428/329 |
| 5,252,441 | A | 10/1993 | James et al. ............... 430/496 |
| 5,910,522 | A | 6/1999 | Schmidt et al. ............ 523/168 |
| 5,985,173 | A | 11/1999 | Gray et al. ............ 252/301.4 R |
| 6,441,077 | B1 | 8/2002 | Border et al. ............. 524/433 |
| 6,548,168 | B1 | 4/2003 | Mulvaney et al. .......... 428/402 |
| 6,888,862 | B1 * | 5/2005 | Duarte et al. ............. 372/39 |

(Continued)

FOREIGN PATENT DOCUMENTS

WO 97/10527 3/1997
WO 99/21934 5/1999

OTHER PUBLICATIONS

Lucien Prod'homme, "A New Approach To The Thermal Change In The Refractive Index Of Glasses," Physics and Chemistry of Glasses, vol. 1, No. 4, Aug. 1960, pp. 119-122.

(Continued)

Primary Examiner—David W. Wu
Assistant Examiner—Rip A. Lee
(74) Attorney, Agent, or Firm—Paul A Leipold

(57) ABSTRACT

A nanocomposite optical plastic article has a plastic host material with a temperature sensitive optical vector (x) and a core shell nanoparticulate material dispersed into the plastic host material. The core shell nanoparticulate material is characterized by a core defined by a nanoparticulate material which has a temperature sensitive optical vector $(x_1)$ and a shell defined by a coating material layer coated onto the core. It is important to the invention that temperature sensitive vector $(x_1)$ is directionally opposed to the temperature sensitive optical vector (x) and $n_{shell} < n_{plastic\ host} < n_{core}$.

18 Claims, 4 Drawing Sheets

U.S. PATENT DOCUMENTS

| | | | |
|---|---|---|---|
| 2003/0119962 A1 | 6/2003 | Border et al. | 524/433 |
| 2003/0136946 A1 | 7/2003 | Kumacheva | 252/500 |
| 2004/0007169 A1* | 1/2004 | Ohtsu et al. | 117/84 |
| 2004/0105980 A1* | 6/2004 | Sudarshan et al. | 428/404 |
| 2005/0082521 A1* | 4/2005 | Torimoto et al. | 257/17 |

OTHER PUBLICATIONS

C. Becker et al., "Optical And Thermomechanical Investigations On Thermoplastic Nanocomposites With Surface Modified Silica Nanoparticles," SPIE Conference on Organic-Inorganic Hybrid Materials for Photonics, San Diego, California, Jul. 1998, SPIE vol. 3469, pp. 88-98.

B. Braune et al., "Tantalum Oxide Nanomers For Optical Applications," SPIE Conference on Organic-Inorganic Hybrid Materials for Photonics, San Diego, California, Jul. 1998, SPIE vol. 3469, pp. 124-132.

Milton Kerker, "The Scattering Of Light," 1969 Academic Press.

* cited by examiner

CORE SHELL NANOCOMPOSITE OPTICAL PLASTIC ARTICLE

FIELD OF THE INVENTION

The invention relates generally to the field of plastic optical articles and films. More particularly, the invention concerns plastic optical materials and articles containing core shell composite nanoparticles, such as plastic lenses, optical films, and optical couplers, that must maintain stable performance characteristics over a broad temperature range.

BACKGROUND OF THE INVENTION

Plastic lenses and glass lenses often perform the same function in optical systems, such as in cameras, microscopes, telescopes, and opthalmic wear. The two main attributes that separate plastic lenses from glass lenses are cost and optical stability. Plastic lenses typically cost 1/100th the price of a similar glass lens while the stability of the refractive index of a glass lens with respect to temperature and humidity is typically 100 times better than that of a plastic lens.

The difference in cost is due largely to the difference in manufacturing processes that are required for the two materials and the relative temperatures that the materials must be formed at. Plastic lenses are typically produced at 230° C. using injection molding at cycle times that are 10 times faster than glass lenses that are largely produced by grinding and polishing or compression molding at 625° C. Grinding and polishing are labor intensive while the high temperatures that glass must be formed at requires expensive mold materials and extensive maintenance costs.

In contrast, the difference in optical stability between plastic and glass is due to differences in their basic material properties. This difference in optical stability results in substantially more variation in focus and image quality in articles such as cameras when plastic lenses are used in place of glass. What is desired, and a remaining challenge in the art, is a material with the optical stability of glass that processes like a plastic.

While optical plastic materials such as cyclic olefins greatly improve the refractive index stability with respect to humidity, improving the refractive index stability with respect to temperature has remained an opportunity. A study on the competing fundamental material characteristics that determine the sign and the magnitude of the dn/dT of glasses is available, for instance, by Lucien Prod'homme, "A New Approach To The Thermal Change In The Refractive Index Of Glasses," Physics and Chemistry of Glasses, Vol. 1, No. 4, August 1960. There are two competing effects that determine the dn/dT in glasses. These are the density change, which produces a negative dn/dT and the electronic polarizability, which produces a positive dn/dT. The net dn/dT in a glass material depends on which effect dominates. In optical plastics however, the electronic polarizability is very small compared to the density change so that all unfilled plastic materials have negative dn/dT values. Nonetheless, the article by Prod'homme does identify the possibility of using glass-like fillers with positive dn/dT values to substantially alter the dn/dT of a glass-plastic composite material.

Nanoparticulate fillers have been used to modify the index of refraction of optical plastics. By using a nanoparticulate filler small enough that it is well below the wavelength of visible light (400–700 nm), light scattering from the nanoparticles is reduced and the filled plastic can remain transparent. WIPO Patent No. WO97/10527 by John S. Toeppen, published Mar. 20, 1997, titled "Structured Index Optics And Ophthalmic Lenses For Vision Correction" describes the use of nanoparticles to increase the refractive index of plastics for opthalmic applications. In addition, technical references that describe the addition of nanoparticles to increase the refractive index of plastics include: "Optical And Thermomechanical Investigations On Thermoplastic Nanocomposites With Surface Modified Silica Nanoparticles" by C. Becker et al., SPIE Conference, Vol. 3469, pp. 88–98, July 1998; and "Tantalum Oxide Nanomers For Optical Applications" by B. Braune et al., SPIE Conference, Vol. 3469, pp. 124–132, July 1998. While these references disclose the use of nanoparticles to modify refractive index of optical plastics they do not discuss the issue of refractive index stability with respect to temperature which requires a different set of characteristics in the nanoparticle.

U.S. Pat. No. 6,441,077 titled "Polysulfone Nanocomposite Optical Plastic Article And Method Of Making Same" issued Aug. 27, 2002 to Border et al., discloses the use of a nanoparticulate filler in an optical plastic, where the nanoparticulate filler has been chosen with a positive dn/dT to counteract the negative dn/dT of the plastic host material such that the overall dn/dT of the nanocomposite has a substantially reduced magnitude of dn/dT, where dn is the change in refractive index of the nanocomposite material produced by a change in temperature dT.

In experiments and computer modeling done at Eastman Kodak, it has been noted that the addition of even very small nanoparticles (10–40 nm) into plastic host materials can lead to low level light scattering or haze in the nanocomposite material which limits light transmission to less than 90%. The haze is especially noticeable at loadings greater than 10% of the nanoparticles in the plastic host material, such as is required to substantially improve the thermal stability of the refractive index (reduced dn/dT) of the nanocomposite material. Haze is also particularly noticeable if the refractive index of the nanoparticles is substantially different from the refractive index of the plastic host material.

While there have been several attempts to modify properties of plastics using nanoparticles, none of these attempts have proven successful in producing optical plastic articles with improved temperature stable optical properties while retaining important processing characteristics and low levels of haze.

U.S. Pat. No. 5,252,441 titled "Transparent Magnetic Recording Layers And Photographic Elements Containing The Same" issued Oct. 12, 1993 to James et al. and U.S. Pat. No. 5,217,804 titled "Magnetic Particles" issued Jun. 8, 1993 to James et al. disclose a coating technique for magnetic particles that reduces the extinction coefficient by applying coatings to high refractive index magnetic particles thereby reducing the haze of the material. Examples show how the coating of the particles with a low refractive index layer reduced the optical density (haze). However, James et al. do not contemplate the impact of the particles or the coating material on the overall thermal stability of the refractive index of the nanocomposite material.

U.S. Pat. No. 5,985,173 titled "Phosphors Having A Semiconductor Host Surrounded By A Shell" issued Nov. 16, 1999 to Gray et al. describes a technique for applying a shell coating to doped zinc sulfide particles. However, the goal of this invention is related to establishing a bandgap to modify the surface electronic state of the doped host particle. This invention does not address the transparency of the nanocomposite material.

Likewise, in WIPO Publication Number WO99/21934 by Mulvaney et al., published May 6, 1999 and titled "Stabilized Particles And Methods Of Preparation And Use Thereof," Mulvaney et al. disclose a method for stabilizing nanoparticles by coating them with an insulating, semiconducting and/or metallic coating. While Mulvaney et al., do disclose techniques for applying coatings to nanoparticles and some of the materials presented do have positive dn/dT values such cadmium sulfide, zinc sulfide, zinc selenide, silica, and alumina, Mulvaney et al. only disclose the use of coated nanoparticles to improve fluorescence, electrofluorescence, and detection of an analyte. Mulvaney et al. do not anticipate the use of coated nanoparticles to modify the optical performance of optical articles such as lenses to improve thermal stability (dn/dT) of the refractive index. In fact, in Example F. on page 19, line 6, Mulvaney et al. make the statement that "the optical properties of the CdS particles are not significantly altered by silica deposition."

Therefore, a need persists in the art for optical plastic articles, such as lenses, and a method of making same that have improved temperature stable optical properties with low levels of haze.

PROBLEM TO BE SOLVED BY THE INVENTION

The goal of the invention is to provide a nanocomposite material which processes like a plastic material but has a significantly reduced magnitude of dn/dT while also having low haze.

Border et al. (U.S. Pat. No. 6,441,077) disclosed a technique in which plastic lens properties can be improved in respect to thermal stability by incorporating certain nanoparticles with a positive dn/dT into the plastic resins (which have a negative dn/dT) used for melt injection molding. As well as providing a positive contribution to dn/dT, the particles must be very small to reduce light scatter and haze in the lens that would degrade image quality. However, if the particles are too big or the refractive index is too high relative to the plastic medium, the light scatter and haze becomes high. This is especially true considering that the path length in lens applications is typically of the order of 1 mm to 10 mm. Another factor is that the loading of nanoparticles required in the plastic host material is often greater than 20% to reduce the dn/dT by more than 20%.

Zinc sulfide (ZnS) is a particularly interesting material for improving thermal stability of optical properties because it has a rather high positive value of the parameter dn/dT (ca +39~+49E−6/° C.) so that less zinc sulfide nanoparticles have to be added to the plastic host material to achieve a level of dn/dT improvement of the nanocomposite. However, zinc sulfide also has a high refractive index, e.g., n~2.39 compared to the plastic host material which has a refractive index of approximately 1.5, which means that scattering and haze will be a serious problem. Scattering and haze are also a problem with other materials with a positive dn/dT, e.g., MgO, Al2O3, AlOOH, SiO2, etc. as mentioned by Border et al., however, scattering and haze with these materials is not as noticeable as with ZnS because the refractive indices of these materials are closer to the refractive index of the plastic host material. The greater the difference in refractive indices between the nanoparticle and the plastic host, the greater will be the haze produced in the nanocomposite material.

There is however a general, inventive trick in the optical science of particles that can be applied to reduce scattering and essentially make nanoparticles invisible in virtually any plastic host material as long as the certain rules and material properties are obeyed.

For a composite or core shell particle as shown in FIG. 6, provided that:

$$n_{shell} < n_{plastic\ host} < n_{core}$$

where the core has real and imaginary optical constants: $n_{core}$, ($k_{core}$~0) the shell has real and imaginary optical constants: $n_{shell}$, ($k_{shell}$~0) and the plastic host has a refractive index: $n_{plastic\ host}$ Then there will be a particular value of the shell radius to core ratio or shell volume to core volume at which the scattering produced by the coated nanoparticle will tend to have very low values or become "essentially invisible" so that the haze of the nanocomposite also tends to have very low levels and the transparency becomes very high. The optimum value for coating thickness can be calculated from an equation given by Milton Kerker in "The Scattering Of Light And Other Electromagnetic Radiation," Academic Press, New York, 1969 (page 192 Equation 5.1.25 and page 197 Equation 5.1.51) which when solved for the shell radius to core ratio becomes:

$$b/a = [(2m_2^2+1)(m_2^2-m_1^2)/(m_2^2-1)(m_1^2+2m_2^2)]^{1/3} \quad \text{Equation 1}$$

where a is the radius of the core nanoparticle, b is the radius of the coated composite nanoparticle, $m_1$ is the ratio of the refractive indices of the core material to the plastic host material ($n_{core}/n_{plastic\ host}$) and $m_2$ is the ratio of the refractive indices of the shell material to the plastic host material ($n_{shell}/n_{plastic\ host}$).

This is a general rule that will hold true for all transparent materials that have a refractive index and do not have high values for the absorption coefficients or imaginary parts of the complex refractive index ($k_{core}$ or $k_{shell}$).

This is the basis of the inventive idea for preparing highly filled plastic lenses with invisible nanoparticles.

The utility of this idea depends on the refractive index contrast between the core, shell, and plastic host. The lower the refractive index of the shell ($n_{shell}$), compared to the refractive index of the plastic host ($n_{plastic\ host}$), the thinner the shell can be and as a result, the less overall nanocomposite nanoparticles need to be added to the plastic host material to obtain the desired dn/dT.

SUMMARY OF THE INVENTION

It is, therefore, a first object of the invention to provide an optical nanocomposite material that can be formed into an optical article that has reduced temperature sensitivity.

Another object of the invention is to provide a method for reducing the haze in the nanocomposite material.

It is a feature of the optical article of the invention that a select nanoparticulate is dispersed into a plastic host material which has a temperature sensitive optical vector that is directionally opposed to the temperature sensitive optical vector of the nanoparticulate filler.

Another feature of the optical article of the invention is that the nanoparticle dispersed in the plastic host material is a composite, core shell nanoparticle wherein the haze produced by the nanoparticle is reduced due the effects of the shell on the core when the materials have been selected such that their refractive indices follow the rule: $n_{core} > n_{plastic\ host} > n_{shell}$. Under particular combinations of shell and core geometry (e.g., radius ratio, or volume ratio or mass ratio), as determined by the refractive index contrasts of the core, shell, and plastic host, the scattering of light, or haze of the nanocomposite material in an optical article will be reduced to very low values.

To accomplish these and other objects, features and advantages of the invention, there is provided, in one aspect of the invention, a nanocomposite optical plastic article comprising a plastic host material having a temperature sensitive optical vector x; a core shell nanoparticulate material dispersed into said plastic host material, said core shell nanoparticulate material having a core defined by a nanoparticulate material having a temperature sensitive optical vector $x_1$, a shell defined by a coating material layer coated onto said core, said core shell having a temperature sensitive optical vector $x_2$, and wherein said temperature sensitive optical vector $x_1$ is directionally opposed to said temperature sensitive optical vector x of said plastic host material.

The present invention has numerous advantageous effects over existing developments, including: the resulting nanocomposite has a significantly lower dn/dT (i.e., change in refractive index with temperature); lenses made with the nanocomposite material have more stable focal length over a given temperature range; low levels of dn/dT are achievable in the nanocomposite material with reduced loading of the nanoparticulate; the viscosity of the nanocomposite material is not significantly higher than the base plastic so that conventional plastic processing techniques can be used; light scattering and haze in the nanocomposite material and the optical article are reduced to the extent that transparency of the nanocomposite is similar to that of the polymethylmethacrylate host material without the nanoparticles; and it has broad utility for making a variety of optical articles such as lenses, filters, film, or slabs.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
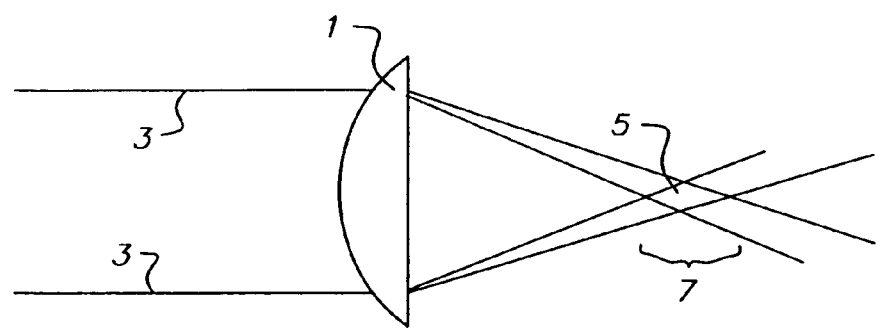
FIG. 1 is a prior art plastic lens showing a range of focal length variation produced by a change in temperature and the resulting change in refractive index.

Turning now to the drawings, and in particular to FIG. 1, prior art lens 1 is illustrated having focal length 5 of light rays 3 that varies significantly with changes in temperature (T) (shown schematically as a focal length range 7). The relationship between focal length 5 and refractive index (n) is given by the below equation:

$$f=R/(n-1) \qquad \text{Equation 2}$$

wherein (f) is the focal length of the lens produced as incident light goes through the lens and is focused at a focal point, (R) is the radius of the lens surface, and (n) is the refractive index of the lens material.

In the case of a camera lens (not shown), the temperature range of operation can easily be 50° C. when used to photograph a tropical island and then later used to photograph a snowy mountain. As an example, a lens having a 10 mm radius and made, for instance, of polymethylmethacrylate, the index of refraction (n) at room temperature is 1.492 and the focal length (calculated from Equation 2 above) is 20.325 mm.

Referring again to FIG. 1, in a typical prior art camera lens, such as lens 1, comprising a plastic material selected from Table I, the change in refractive index (dn) over the temperature range of operation is 0.0055. Further, the change in focal point 5 (shown as feature 7 in FIG. 1) of lens 1 from Equation 1 is 0.225 or 1%. Skilled artisans will appreciate that the image quality of images made with lens 1 will not be the same over the entire operating temperature range due to variations in focus quality.

Figure 2A:
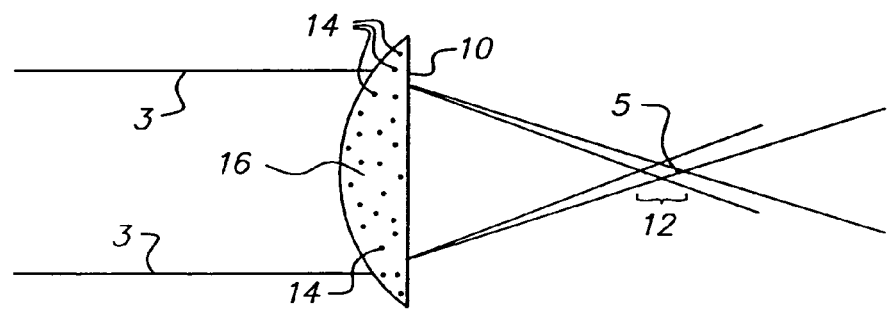
FIG. 2*a* shows a lens made from a nanocomposite material that has improved stability of refractive index with respect to temperature and an associated reduced range of focal length variation produced by a change in temperature.
Figure 2B:
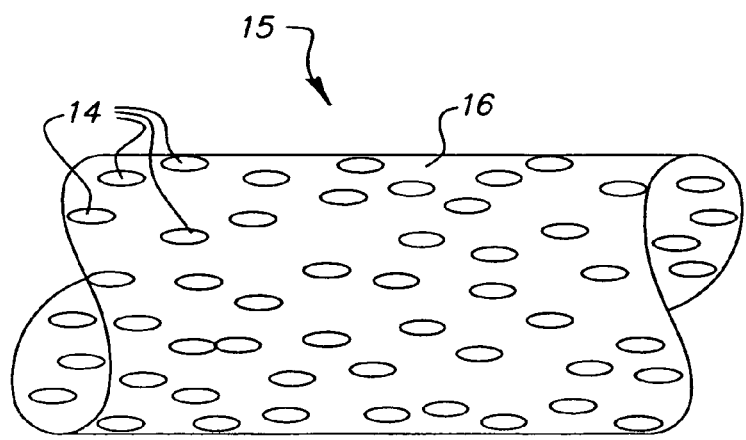
FIG. 2*b* shows a representative view of the nanocomposite material as a pellet before forming into an optical article.

Referring to FIGS. 2*a* and 2*b*, the reduced temperature sensitive, nanocomposite optical article, such as lens 10, of the invention is illustrated. According to FIG. 2*a*, the nanocomposite optical article or lens 10 is composed of a plastic host material 16 and a select nanoparticulate material 14 dispersed in the plastic host material 16 (shown clearly in FIG. 2*b*). The plastic host material 16 may be either a thermoplastic or thermoset material. It is important to the invention that the plastic host material 16 be selected based on a predetermined temperature sensitive optical vector x, for instance refractive index n. Similarly, the selection of the nanoparticulate material 14 dispersed in the plastic host material 16 must be based on a corresponding predetermined temperature sensitive optical vector $x_1$, specifically refractive index. In this case, temperature sensitive optical vectors x, and $x_1$ are defined by a change in refractive index (dn) of the plastic host material 16 and the nanoparticulate material 14, respectively, with respect to a change in temperature (dT). It is also important to our invention that $x_1$ is directionally opposed to x. By carefully selecting a nanoparticulate material 14 having a dn/dT, i.e., a rate of change of refractive index with respect to temperature, that has a sign that is directionally opposed to the dn/dT of the plastic host material 16, it is possible to significantly reduce the dn/dT of the resulting nanocomposite material 15 at relatively low loadings of the nanoparticulate material 14. As a result, the viscosity of the nanocomposite material 15 is not drastically increased and the processing characteristics will be similar to other optical plastics. Consequently, the resulting optical nanocomposite lens 10 has a focal length range 12 (FIG. 2*a*) over the operating temperature range that is much less than the focal length range 7 exhibited by the prior art lens 1 shown in FIG. 1.

According to Tables I and II, several select dn/dT values for plastic (polymerics) host materials and inorganic nanoparticulate fillers that comprise the nanocomposite material of the invention are illustrated.

TABLE I

Approximate dn/dT for Various Optical Plastics

| Plastic | dn/dT ($10^{-6}$/° C.) |
| --- | --- |
| Polymethylmethacrylate | −105 |
| Polystyrene | −127 |
| Polycarbonate | −114 |
| Cyclic olefin copolymer | −102 |
| Polysulfone | −100 |
| Kodak KTFR Photoresist (liquid) | −436 |
| Olin HIPR 6505 Photoresist (liquid) | −230 |
| Olin HIPR 6512 Photoresist (liquid) | −268 |

TABLE II

Approximate dn/dT for Various Inorganic Materials with Transmission Bands in Visible Wavelengths

| Material | dn/dT ($10^{-6}$/° C.) |
| --- | --- |
| Barium fluoride | −16 |
| Aluminum oxide | 14 |
| ALON | 12 |
| Beryllium oxide | 10 |
| BBO | −16 |
| Diamond | 10 |
| Calcium carbonate | 7 |
| Calcium fluoride | −10 |
| Cesium bromide | −85 |
| Cesium iodide | −99 |
| Potassium bromide | −42 |
| Potassium chloride | −36 |
| Potassium fluoride | −23 |
| Potassium iodide | −45 |
| Potassium titano phosphate | 12 |
| Lithium borate | −7 |
| Lithium fluoride | −17 |
| Lithium iodate | −80 |
| Magnesium aluminate | 9 |
| Magnesium oxide | 19 |
| Sodium bromide | −40 |
| Sodium chloride | −35 |
| Sodium fluoride | −13 |
| Sodium iodide | −50 |
| Silicon oxide | −5 |
| Silica | 12 |
| Tellurium oxide | 9 |
| Titanium dioxide | −1 |
| Yttrium oxide | 8 |
| Zinc Sulfide | 49 |
| Zinc Selenide | 91 |
| Cadmium Sulfide | 80 |
| Magnesium fluoride | 1 |
| Barium fluoride | −16 |

Referring again to FIGS. 2a and 2b, in addition to the plastic host material 16 and the nanoparticulate material 14 having directionally opposed dn/dT, the invention contemplates other qualifications for the nanoparticulate material 14 to make the useful, novel and unobvious optical nanocomposite material 15 of the invention. For instance, the nanoparticulate material 14 must be transparent in the wavelength region of interest to maintain high optical transmission levels. Moreover, the nanoparticulate material or nanoparticles 14 must be available in a particle size range that is less than 40 nm to avoid scattering light. Most preferred is a particle size range below 20 nm. Further, it must be possible to disperse the nanoparticles 14 into the base or host plastic such that no significant amounts of agglomerates and/or voids larger than 40 nm occur which would scatter light. FIG. 2b shows a representative view of the nanoparticles 14 dispersed into the plastic host material 16. The nanoparticles 14 are shown dispersed evenly throughout the plastic host material 16. The nanoparticles 14 as shown do not have any larger agglomerates or voids associated with them. Furthermore, the cost of the nanoparticles 14 and any associated surface treatments of the nanoparticles 14 to improve dispersibility or reduce reactivity, etc. must be low enough that the total cost of the molded optical article is significantly less than a glass article.

As illustrated in Tables I and II, there exists a number of inorganic materials that have dn/dT values with an opposite sign compared to plastic host materials. Thus, a nanocomposite material with significantly improved refractive index stability with respect to temperature can be formulated by dispersing a select nanoparticulate material into a plastic host material that have directionally opposed (or opposite signs) dn/dT.

According to another aspect of the invention, a method of manufacturing a reduced temperature sensitive optical article or lens 10 (as described above) includes the step of selecting a plastic host material 16, such as one described in Table I. According to the invention, the selected plastic host material 16 has a temperature sensitive optical vector x or dn/dT, as described above. A nanoparticulate material 14 (Table II) is selected for dispersing in the plastic host material 16. The select nanoparticulate material 14, according to the invention, is required to have a corresponding temperature sensitive optical vector $x_1$. Moreover, it is further important to the invention that $x_1$ is directionally opposed to x, i.e., one of the two must be negative and the other positive. Once the nanoparticulate material 14 is selected, it is then dispersed in the plastic host material 16 using suitable dispersion techniques, such as compounding or solvent dispersion. Once the nanoparticulate material 14 is dispersed into the plastic host material 16, a nanocomposite material 15 is formed. The nanocomposite material 15 can then be used to form an array of optical articles such as the lens 10 of the invention having reduced temperature sensitivity.

Figure 6:
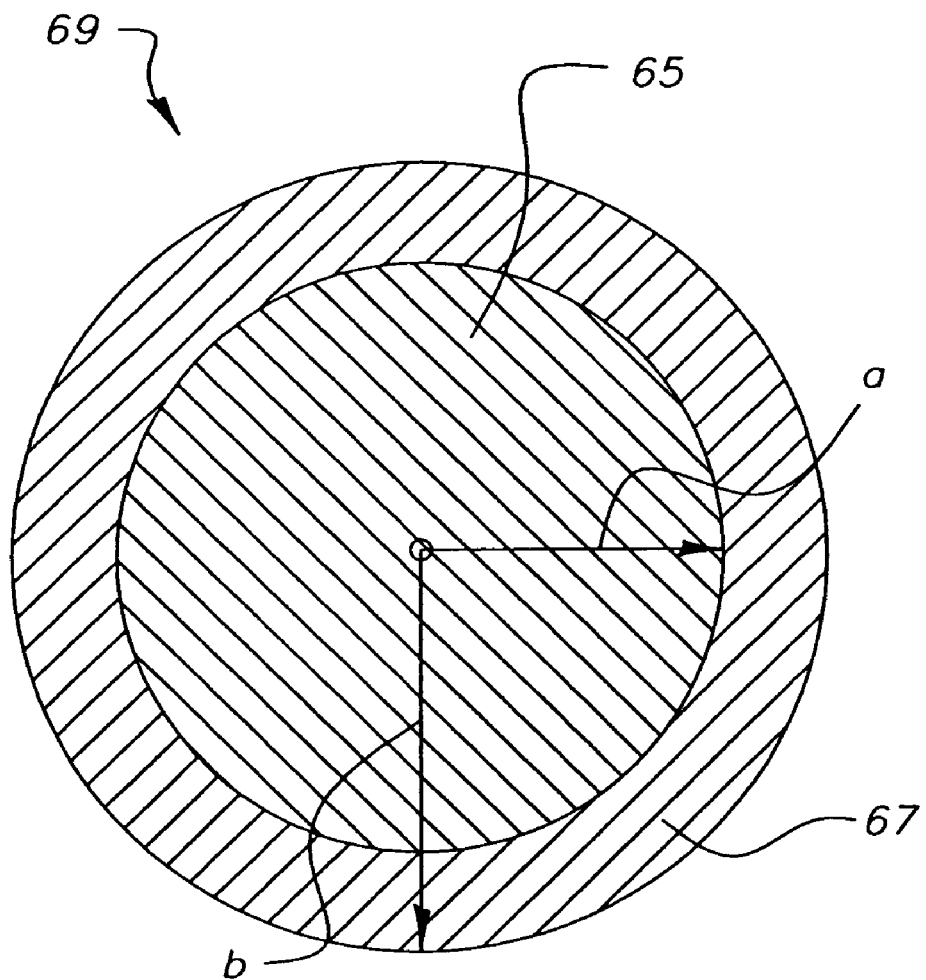
FIG. 6 is a diagram of a core shell composite nanoparticle used in the plastic article of the invention.

Referring to FIGS. 2a, 2b and 6, in the event that the index of refraction n of the selected nanoparticulate material 14 differs from the index of refraction of the plastic host material 16 by more than approximately 0.035, and if the nanoparticles 14 are larger than approximately 3 nm in size, the haze of the resulting nanocomposite material 15 can be significantly reduced if a composite nanoparticulate material 69 (FIG. 6) is used. As illustrated in FIG. 6, composite nanoparticle 69 is composed of a core nanoparticle 65 that has been coated to form a shell 67 around the core nanoparticle 65. According to our invention, the indices of refraction of the materials should follow the rule that: $n_{shell} < n_{plastichost} < n_{core}$ for the coating to reduce the haze of nanocomposite material 15. Usually the refractive index of the core, e.g., ZnS (e.g. 2.39) will be greater than the plastic material (1.5 to 1.6) and the shell 67 must be less than the plastic material (this includes any non-absorbing, low refractive index material, e.g., amorphous silica, 1.45 to 1.47; fluoropolymer, ca 1.4; magnesium fluoride, 1.38; silsesquioxane materials, 1.47). Preferably, the shell material will also have a temperature sensitive vector $x_2$ that is directionally opposed to the temperature sensitive vector x of the plastic host material.

Figure 3:
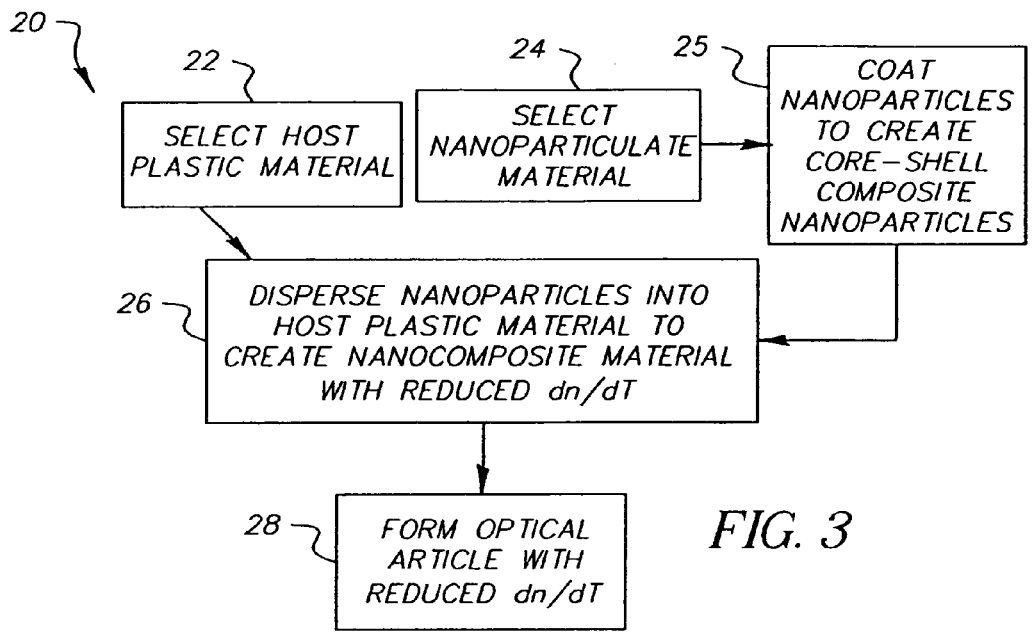
FIG. 3 is a block diagram of the process for manufacturing a plastic optical article of the invention with improved refractive index stability.

Referring to FIG. 3, a diagram 20 of the method for making the reduced dn/dT nanocomposite material 15 for optical articles, such as lens 10, is depicted. First the plastic host material 16 (FIGS. 2a, 2b) is selected (Step 22) based on optical, structural, and thermal design considerations such as % transmission, % haze, index of refraction, yield strength at a temperature, impact strength, scratch resistance, glass transition temperature, etc. Second, the nanoparticulate material 14 (FIGS. 2a, 2b) is preferably selected (Step 24) based on dn/dT, transparency in the wavelength region of interest, index of refraction, particle size, cost, and availability. As disclosed in this invention, selecting suitable nanoparticulate materials 14 requires selecting a material that has a dn/dT that has a sign that is opposite to the plastic host material 16 being used and an average particle size less than about 40 nm. Third, the nanoparticles are coated (Step 25) to create a core shell composite nanoparticle. The coating should be selected such that: $n_{shell} < n_{plastic\ host} < n_{core}$ to reduce the haze in the final nanocomposite material. Fourth, the composite nanoparticles 14 are preferably dispersed (Step 26) into the plastic host material 16 although other mixing processes could be used, such as roll milling. Dispersion step 26 can be accomplished through preferably compounding (refer to FIG. 4) even though solvent dispersion (refer to FIG. 5) can be used with good results. Fifth, the optically modified material 15 is formed (Step 28) into an optical article or lens of the invention.

Figure 4:
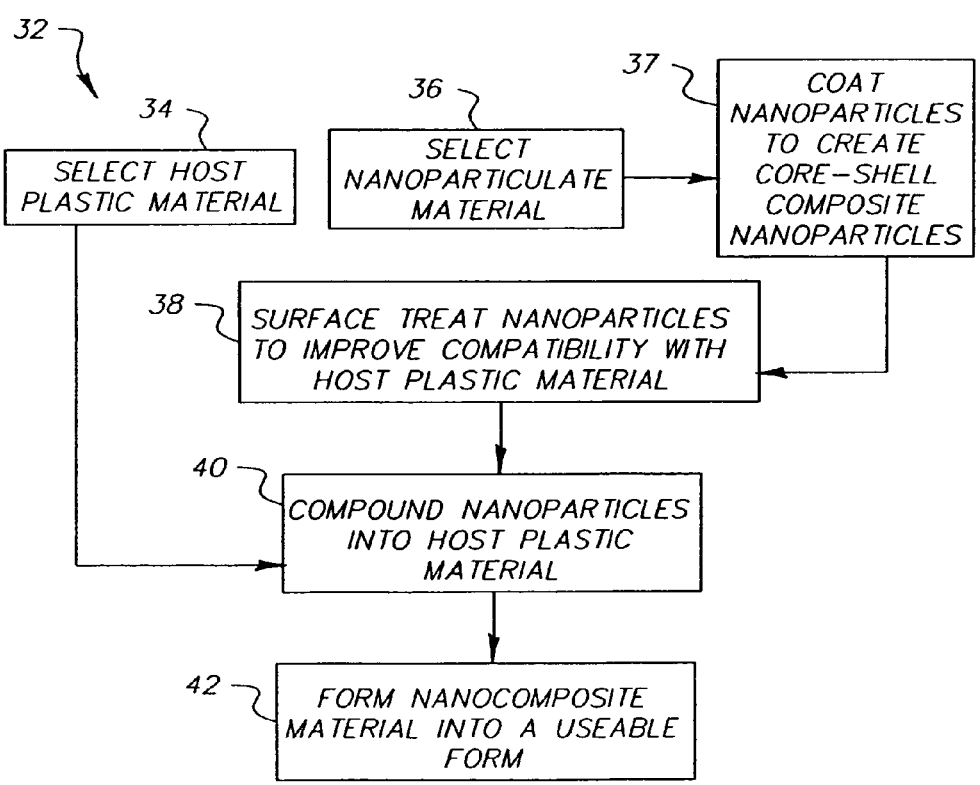
FIG. 4 is a schematic diagram of a nanocomposite material making process of the invention based on compounding.
Figure 5:
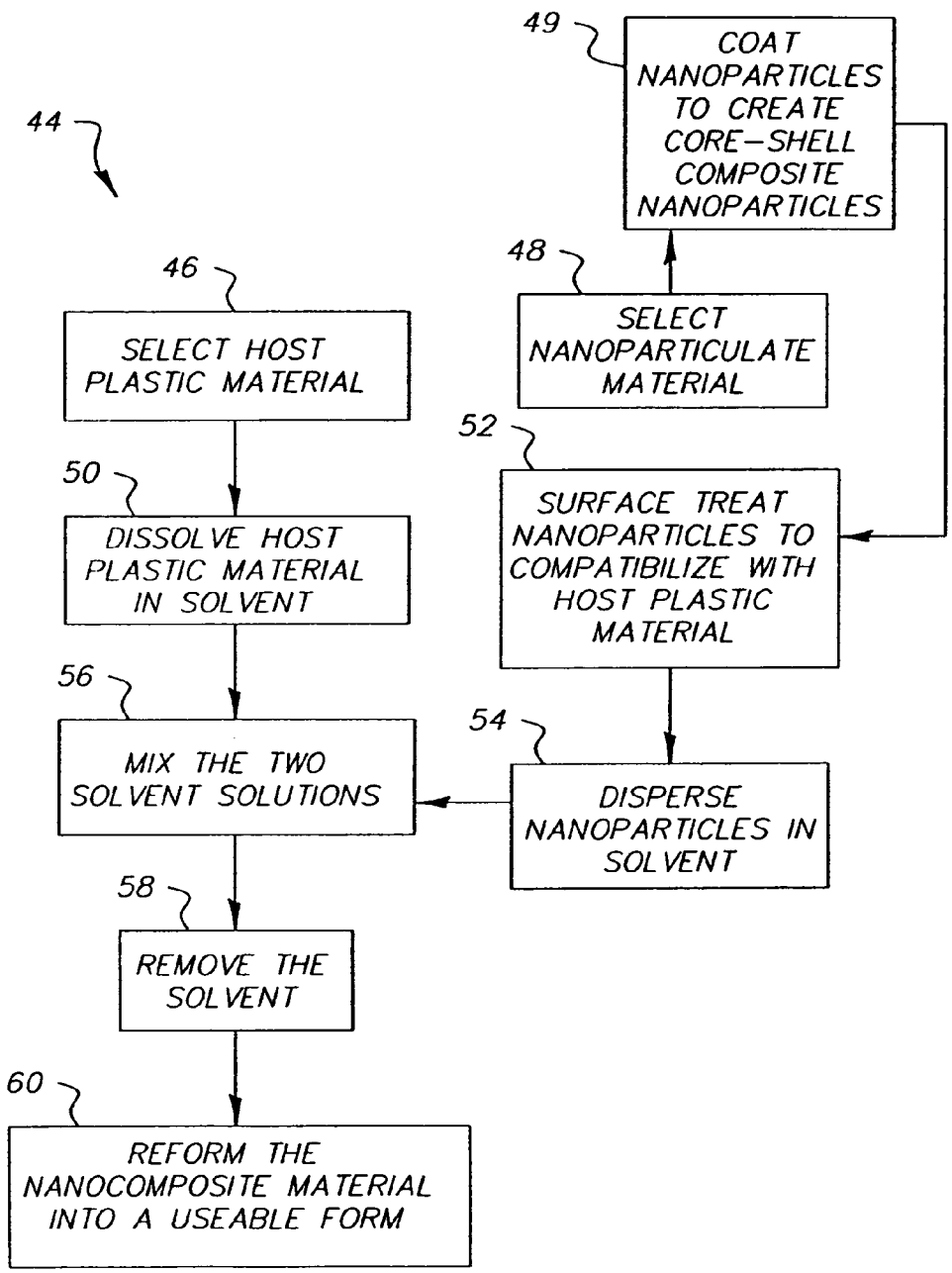
FIG. 5 is a schematic diagram of another nanocomposite material making process of the invention based on solvent dispersion.

Referring to FIGS. 4 and 5, two methods of dispersing (Step 26) the nanoparticles 14 into the plastic host material 16 are schematically illustrated. According to FIG. 4, an outline of the process 32 for dispersion (Step 26) through compounding (Step 40) is depicted. As in FIG. 3, the plastic host material 16 is selected (Step 34), the nanoparticulate is selected (Step 36) and the nanoparticles are coated (Step 37) to create composite nanoparticles. In a preferable step, the composite nanoparticles are then surface treated (Step 38) to improve the compatibility with the plastic host material 16 thereby making it easier to fully disperse the nanoparticles. Skilled artisans will appreciate that this treatment (Step 38 in FIG. 4 and Step 52 in FIG. 5) could be applied to the nanoparticles 14 directly or added as an additive to the compounder (Step 40) along with the nanoparticles 14 and the plastic host material 16. In compounding, the nanoparticles 14 are then fed into a compounder (Step 40), such as a twin screw extruder or a Farrell continuous mixer, along with pellets of the selected plastic host material 16. After compounding (Step 40), the optically modified material 15 (nanocomposite material) is pelletized (Step 42) for use in an injection molding machine (not shown).

According to FIG. 5, in the solvent-based dispersion process (Step 44), the plastic host material 16 is selected 46 and then dissolved in a solvent (Step 50). The nanoparticles are selected (Step 48), coated to create core shell composite nanoparticles (Step 49) and then preferably surface treated (Step 52) to improve compatibility with the plastic host material 16. The treated composite nanoparticles are then dispersed in a solvent (Step 54) which is compatible with the solvent that the plastic host material 16 as been dissolved in (Step 50). The two solvent solutions are then mixed together (Step 56). After mixing the two solvent solutions together in Step 56, the solvents are removed in Step 58 and the optically modified material 15 (nanocomposite material) is pelletized (Step 60) for use in an injection molding machine (not shown).

Referring to FIGS. 4 and 5, by following either method depicted in process diagrams 32 and 44 for making the optically modified material 15, the end result is typically plastic pellets which contain fully dispersed nanoparticles 14, such as that shown in FIG. 2b. The resultant plastic pellets contain the composite nanoparticles present in sufficient quantity to deliver the reduced dn/dT desired while preserving a low level of haze.

Injection molding, compression molding, and casting are the three preferred techniques for forming the optical article 10 (refer to FIG. 3 step 28) of the invention. For the case of compression molding, it may be more advantageous to use optically modifed material in the form of sheet or film. For the case of casting, the optically modified material may be in the form of a liquid.

In a preferred embodiment, the nanocomposite optical article of manufacture 10 is comprised of a plastic host material 16 selected from the group consisting of thermoplastic materials and thermoset materials. Thermoplastic materials used in optical articles include the following materials: polymethylmethacrylate, polycarbonate, polystyrene, polysulfone, polyether sulfone, cyclic olefins, and blends and copolymers of those listed. Thermoset materials used in optical articles include the following materials: diallyl glycolcarbonate, epoxides, and thermoset polyesters.

Typically the reduced dn/dT articles of manufacture produced within the contemplation of the invention are simple lenses, an array of lenses, opthalmic lenses, window glazing, optical fibers, optical couplers, cover glasses for digital imagers, microlenses on digital imagers, and other optical devices of the like. Typically, all of these articles of manufacture require a low level of haze.

Skilled artisans will appreciate that modification of the optical properties of the host material is achieved, in accordance with the method of the invention, by reducing the dn/dT of the nanocomposite material and reducing haze. In our preferred embodiment, this is achieved by dispersing a nanoparticulate material filler having a dn/dT with a sign that is opposite that of the base plastic in which the nanoparticulate is a core shell composite nanoparticle with indices of refraction $n_{shell} < n_{plastic\ host} < n_{core}$.

EXEMPLARY EXAMPLES

Example 1

An example of the aforementioned method for reducing dn/dT of an optical plastic while retaining excellent transparency follows:

Three (3) samples were prepared using a polymethylmethacrylate plastic base material (n=1.49) and nanoparticle fillers of approximately 15 nm size. The nanoparticles were all solvent dispersed at approximately 4% loading. The first sample was made with silica nanoparticles (n=1.45) and it was very clear. This result is due to the fact that the silica nanoparticles have nearly the same index of refraction as the polymethylmethacrylate plastic host material (1.49 vs 1.45) and light scattering does not occur to an appreciable extent. The second sample was made with magnesium oxide nanoparticles (n=1.72) and it was quite hazy. The third sample was made with zinc sulfide nanoparticles (n=2.35) and it was nearly opaque.

Observations of relative levels of haze produced in the 3 samples were supported by calculated values from a light scattering model based on the Debye form of Rayleigh-Mie Theory (Debye, P, Ann. d. Phys. 30, 57, 1909) in which the haze (haze=[100−transmitted light %+reflected light %]) was calculated to be 1%, 16% and 53%, respectively.

A second set of calculations done by solving the light scattering model for each interface on core shell composite nanoparticles shows that by applying coatings of silica (n=1.45) to the magnesium oxide and zinc sulfide nanoparticles of 7.5 nm and 14.8 nm thicknesses respectively, the haze was reduced to 1.5 % for both cases.

Example 2

A further example shows the importance of the coating thickness on the level of haze produced by composite nanoparticles. Again, the light scattering model was used to evaluate the haze levels produced by composite nanoparticles with various shell thicknesses. Three (3) coating thicknesses were evaluated with 4% zinc sulfide (n=2.35) nanoparticles in polymethylmethacrylate (n=1.49). The zinc sulfide nanoparticles were 20 nm and coated with silica (n=1.45) with the coating thicknesses being 5 nm, 8 nm and 17 nm where the 17 nm thick coating is the optimum thickness as calculated by Equation 1. The results showed haze levels of 44%, 29%, and 2% respectively which shows that coating thickness is important to produce the lowest haze level.

Example 3

Another example shows the impact of different types of coatings on optimum coating thickness. The light scattering model was again used to evaluate material combinations and the effect on haze. In this case, 10 nm zinc sulfide (n=2.35) nanoparticles coated with 3 nm of magnesium fluoride (n=1.38) and loaded to 4% in a polycarbonate (n=1.59) plastic host. The result was a haze level of only 1%. In this case, the refractive index of the coating is quite different from the plastic host refractive index, 1.38 vs 1.59. Consequently the coating thickness does not need to be as thick as the case examined in Example 2 where the coating had to be 5 times as thick (17 nm) because the refractive index of the coating was close to that of the plastic host, 1.45 vs 1.49.

The invention has been described with reference to a preferred embodiment. However, it will be appreciated that variations and modifications can be effected by a person of ordinary skill in the art without departing from the scope of the invention.

PARTS LIST 1 prior art lens
3 incident light rays
5 focal length of lens 1
7 range of change of the focal length produced by a change in temperature of the lens
10 nanocomposite lens
12 reduced range of change of the focal length produced by a change in temperature of the nanocomposite lens
14 nanoparticulate material
15 nanocomposite material (representation of nanoparticles dispersed into a plastic host material)
16 plastic host material
20 schematic of method for making reduced dn/dT article
22 step of selecting plastic host material
24 step of selecting the nanoparticulate material
25 step of coating the nanoparticles to create core shell composite nanoparticles
26 step of dispersion
28 step of forming an optical article
32 dispersion through compounding process
34 step of selecting host material
36 step of selecting nanoparticulate material
37 step of coating the nanoparticles to create core shell composite nanoparticles
38 step of surface treating nanoparticles
40 step of compounding nanoparticles
42 step of forming the nanocomposite into a useable form such as pelletizing
44 solvent based dispersion process
46 step of selecting host material
48 step of selecting nanoparticles
49 step of coating the nanoparticles to create core shell composite nanoparticles
50 step of dissolving host material in solvent
52 step of surface treating nanoparticles
54 step of dispersing nanoparticles in solvent
56 step of mixing together products of steps 50 and 54
58 step of removing the solvent
60 step of forming a useable material form
65 core material of composite nanoparticle
67 shell material of composite nanoparticle
69 composite nanoparticle

What is claimed is:

1. A nanocomposite optical plastic article, comprising: a plastic host material having a temperature sensitive optical vector x; a core shell nanoparticulate material dispersed into said plastic host material, said core shell nanoparticulate material having a core defined by a nanoparticulate material having a temperature sensitive optical vector $x_1$, a shell defined by a coating material layer coated onto said core, said shell having a temperature sensitive optical vector $x_2$ and wherein said temperature sensitive optical vector $x_1$ is directionally opposed to said temperature sensitive optical vector x of said plastic host material, wherein said temperature sensitive optical vector x is defined as an index of refraction $n_{plastic\ host}$, said temperature sensitive optical vector $x_1$ is defined as an index of refraction $n_{core}$, and wherein said temperature sensitive optical vector $x_2$ is defined as an index of refraction of the shell $n_{shell}$, wherein $n_{shell} < n_{plastic\ host} < n_{core}$, wherein said core comprises a material selected from the group consisting of: ALON, aluminum oxide, beryllium oxide, cadmium sulfide, calcium carbonate, diamond, magnesium aluminate, magnesium fluoride, magnesium oxide, potassium titano phosphate, silica, tellurium oxide, yttrium oxide and zinc selenide.

2. The nanocomposite optical plastic article recited in claim 1 wherein said plastic host material comprises a material selected from the group consisting of: polymethylmethacrylate, polystyrene, polycarbonate, cyclic olefin polymer, polysulfone, polyethersulfone, diallyl glycolcarbonate, epoxides, thermoset polyesters, and blends and copolymers of those listed.

3. The nanocomposite optical plastic article recited in claim 1 wherein said nanoparticulate material has a particle size of about 15 nm.

4. The nanocomposite optical plastic article recited in claim 1 wherein said plastic host material is polymethymethacrylate.

5. The nanocomposite optical plastic article recited in claim 3 wherein said nanoparticulate material comprises silica nanoparticles.

6. The nanocomposite optical plastic article recited in claim 3 wherein said nanoparticulate material comprises magnesium oxide nanoparticles.

7. The nanocomposite optical plastic article recited in claim 1 wherein said nanoparticulate material has a particle size less than about 40 nm.

8. The nanocomposite optical plastic article recited in claim 1 wherein said nanoparticulate material has a particle size less than about 20 nm.

9. The nanocomposite optical plastic article recited in claim 1 wherein said coating material layer has a temperature sensitive optical vector $x_2$, wherein $x_2$ is directionally opposed to said temperature sensitive optical vector x of said plastic host material.

10. The nanocomposite optical plastic article recited in claim 1 wherein said optical article is a lens.

11. The nanocomposite optical plastic article recited in claim 1 wherein said optical article is an optical fiber.

12. A nanocomposite optical plastic article, comprising: a plastic host material having a temperature sensitive optical vector x; a core shell nanoparticulate material dispersed into said plastic host material, said core shell nanoparticulate material having a zinc sulfide core defined by a nanoparticulate material having a temperature sensitive optical vector $x_1$, a magnesium fluoride shell defined by a coating material layer coated onto said zinc sulfide core, said magnesium fluoride shell having a temperature sensitive optical vector $x_2$ and wherein said temperature sensitive optical vector x is directionally opposed to said temperature sensitive optical vector x of said plastic host material, wherein said temperature sensitive optical vector x is defined as an index of refraction $n_{plastic\ host}$, said temperature sensitive optical vector $x_1$ is defined as an index of refraction $n_{core}$, and wherein said temperature sensitive optical vector $x_2$ is defined as an index of refraction of the magnesium fluoride shell $n_{shell}$, wherein $n_{shell} < n_{plastichost} < n_{core}$.

13. The nanocomposite optical plastic article recited in claim 12 wherein said zinc sulfide nanoparticles have a particle size of about 10 nm, said zinc sulfide nanoparticles being provided with a 3 nm thick coating layer of magnesium fluoride forming a core shell nanoparticulate material, said core shell nanoparticulate material being dispersed at 5 to 50 wt-% in a polycarbonate plastic host material.

14. The nanocomposite optical plastic article recited in claim 12 wherein said plastic host material comprises a material selected from the group consisting of: polymethylmethacrylate, polystyrene, polycarbonate, cyclic olefin polymer, polysulfone, polyethersulfone, diallyl glycolcarbonate, epoxides, thermoset polyesters, and blends and copolymers of those listed.

15. The nanocomposite optical plastic article recited in claim 12 wherein said nanoparticulate material has a particle size less than about 40 nm.

16. The nanocomposite optical plastic article recited in claim 12 wherein said nanoparticulate material has a particle size less than about 20 nm.

17. The nanocomposite optical plastic article recited in claim 12 wherein said optical article is a lens.

18. The nanocomposite optical plastic article recited in claim 12 wherein said optical article is an optical fiber.

* * * * *